June 28, 1966    T. C. HOLKA ETAL    3,257,936
FOOD COOKING APPARATUS
Filed June 14, 1963

INVENTORS
THOMAS C. HOLKA
CHARLES J. HADDAD
ROY T. BUTLER
HARLEY M. SELLING

JOHN E. McRAE

BY

United States Patent Office 3,257,936
Patented June 28, 1966

3,257,936
FOOD COOKING APPARATUS
Thomas C. Holka, 7581 Dobel, Detroit, Mich.; Charles J. Haddad, 23320 Outer Drive, Allen Park, Mich.; Roy T. Butler, 20473 River Oaks Drive, Dearborn, Mich.; and Harley M. Selling, 18950 Oak Drive, Detroit, Mich.
Filed June 14, 1963, Ser. No. 287,835
3 Claims. (Cl. 99—421)

This invention relates to food cooking apparatus and particularly to mechanisms for powering a rotary food support.

In one of its embodiments the invention comprises a barbeque-type cooking apparatus having a firepot for containing burning coals, and a rotary spit-type food support disposed above the firepot; the food support is coupled to a small electric motor for rotation during the food-cooking operation. In order to power the electric motor there is provided a thermopile which includes a series of hot junctions located adjacent the burning coals in the pot and a series of cold junctions located remote from the burning coals in a relatively cool area. The temperature differential between the hot and cold junctions creates the electric energy for driving the electric motor.

One object of the invention is to provide a thermopile particularly designed for powering the motor of a rotary food support structure.

Another object is to provide a thermopile wherein a relatively large temperature differential is maintained between the hot and cold junctions.

A further object is to provide a thermopile which is particularly designed and positioned so that its hot junctions are substantially directly contacted by the burning coals in the firepot whereby to have a relatively high operating temperature.

A still further object is to provide a thermopile which is particularly suited to have its cold junctions thermally isolated from burning coals in a firepot so that said junctions have a relatively low operating temperature.

An additional object is to provide a thermopile wherein the hot and cold junctions are separated from one another by a fire-resistant insulator disc.

Another object is to provide a thermopile comprising an insulator disc, wherein the hot junctions are located just far enough from one face of the disc to promote satisfactory heating thereof, and the cold junctions are located just far enough from the other face of the disc to promote satisfactory cooling thereof.

Another object is to provide a thermopile having a relatively small electrical resistance, commensurate with attainment of the other above-enumerated objects.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
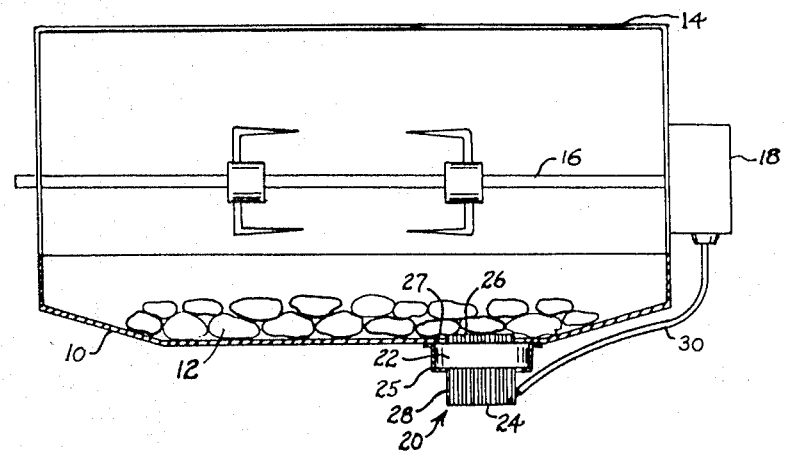
FIGURE 1 is a sectional view illustrating a food cooking apparatus having one embodiment of the invention incorporated therein.

In FIG. 1 of the drawings there is shown a food cooking apparatus comprising a conventional circular firepot 10 for containing the burning coals 12. Suitably supported on firepot 10 is a conventional semi-cylindrical hood 14 having slots therein for retaining the rotary spit-type food support 16. As is conventional, food support 16 is operatively connected with the output member of an electric motor 18.

In the present invention as illustrated in FIG. 1, electric motor 18 is arranged to be energized by a thermopile designated generally by numeral 20. In the FIG. 1 form the thermopile comprises a fire-resistant carrier disc 22 formed for example of ceramic insulator material, and a series of connected thermocouple wires 24. An annular flanged bracket 25 may be provided for retaining the thermopile against the bottom wall of the firepot.

As shown in FIG. 1, the firepot bottom wall is provided with an opening 27 to permit the thermocouple wires to substantially directly engage the burning coals. The thermocouple wires extend through disc 22 and have their hot junctions 26 located within the interior of pot 12 and their cold junctions 28 disposed outwardly of the pot. The end ones of the junctions are connected to lead wires which extend within a conduit 30 over to the electric motor 18. If desired the conduit may have a detachable connection with the motor to permit separation of the hood-motor assembly from pot 10. Suitable legs (not shown) may be provided for supporting the firepot above the ground, table or other sub-surface.

In operation of the FIG. 1 embodiment, when the coals in the firepot are at a satisfactory temperature, as for example above 1,000° F., the hot junctions 26 are heated while the cold junctions remain relatively cool. The temperature differential thus generates an electric current which is transmitted to motor 18 via the electrical leads within conduit 30. The cold junctions are preferably exposed to the atmosphere and are elongated to promote the cooling action.

Figure 2:
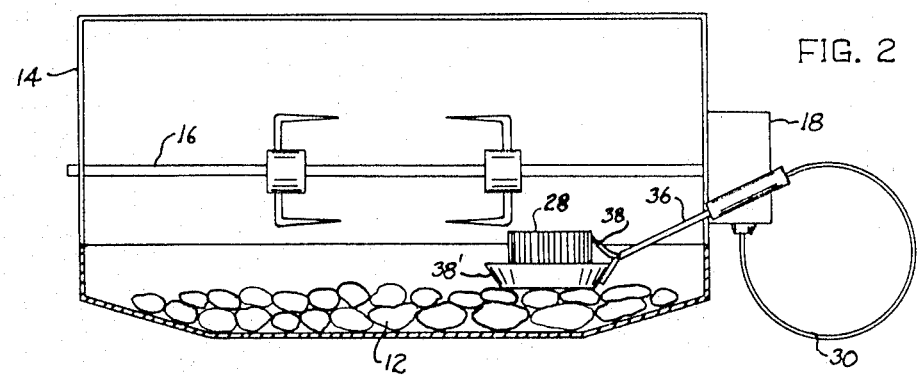
FIG. 2 is a sectional view of another food cooking apparatus having a second embodiment of the invention incorporated therein.
Figure 3:
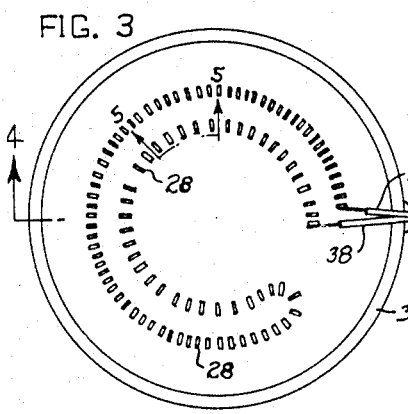
FIG. 3 is a plan view of the FIG. 4 thermopile.
Figure 4:
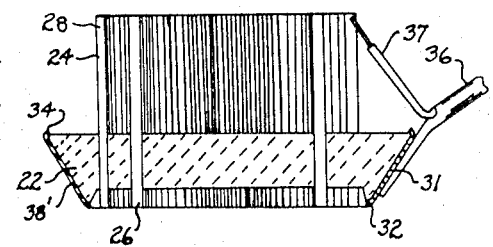
FIG. 4 is a sectional view taken substantially on line 4—4 in FIG. 3.
Figure 5:
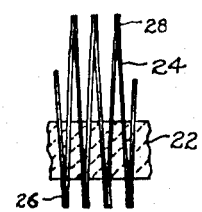
FIG. 5 is a sectional view taken on line 5—5 in FIG. 3.

In FIGS. 2 through 4 there is shown a second embodiment of the invention wherein the thermopile is built separately from firepot 10. As shown particularly in FIG. 4 the thermopile comprises a ceramic disc 22 and a series of thermocouple elements 24 extending therethrough. The disc is designed so that the hot junctions 26 are located adjacent the lower face of the disc and the cold junctions 28 are located above the upper face of the disc when the instrument is positioned atop the burning coals as shown in FIG. 2. In the FIG. 4 arrangement the disc is mounted in a metal ring 31 which is provided with a lower flange 32 and an upper flange 34. A suitable hollow handle structure 36 is connected to ring 31 for containing lead wires 37 and 38 which extend from motor 18. The handle is optional and could be omitted if desired.

As shown best in FIGS. 3 and 4, the thermocouple wires extend completely through the ceramic disc 22 in zigzag fashion and are connected at their ends to form the cold junctions 26 and the hot junctions 28. As shown, there are approximately one hundred series-connected thermocouples arranged in a circular pattern in the disc so that the endmost thermocouple elements are located adjacent one another for connection with the lead wires, whereby to form a complete electrical circuit.

It will be noted that the hot junctions 26 are relatively close to the lower face of disc 22, whereas the cold junctions 28 are relatively far away from the upper face of disc 22. Preferably the downward protrusion of the hot junctions is about one-quarter inch and the upward protrusion of the cold junctions is about one or one and one-quarter inches. The ceramic disc 22 is preferably about five-eighths inch thick.

It has been found that the one-quarter inch protrusion of the hot junctions is sufficient for these junctions to attain a satisfactory operating temperature. The hot junctions could apparently protrude further without adversely affecting the operating temperature, but such protrusion would increase the amount of thermocouple material and would thus increase the cost as well as the electrical resistance in the electrical circuit; additionally, the added protrusion would be a source of possible breakage of the thermocouples.

The approximately one inch protrusion of the cold junctions 28 has been found to provide satisfactory cooling of these junctions. When the cold junctions protrude less than this distance they are not apparently cooled as well as they should be for best performance. Extra protrusion beyond the one inch appears to merely increase the thermocouple cost and electrical resistance without producing any substantial added cooling. Thus, a protrusion of about one inch is believed adequate for good performance of the thermopile.

The thermopile as shown in FIG. 4 includes a metal retainer ring 31. This ring does not enter into the operation of the thermopile except that it contains the ceramic disc 22 and thus allows the ceramic disc to function even should it crack during service. Preferably the ring does not have any surfaces which can radiate heat onto the cold junctions 28. Thus flange 34 extends only far enough over the disc upper face to retain the disc in place; preferably no heat shield extends upwardly from ring 31, since such a structure would tend to radiate heat onto the cold junctions.

It will be noted that the disc has an annular flaring edge surface 38'. When the thermopile is positioned atop the burning coals as shown in FIG. 2 this annular flaring edge surface acts to direct the radiant heat away from the cold junctions 28. It has been found that when the edge is not flared the heat tends to curl up and flow into the cold junctions 28 whereas, when the edge is flared the heat-curling action takes place above the cold junctions so that there is a relatively cool space at these junctions, thus tending to improve the performance.

It will be understood that the flaring edge feature is desirable only in the FIG. 2 arrangement, and that the FIG. 1 arrangement can be employed with a carrier disc 22 having a straight annular edge. In the FIG. 1 arrangement the thermocouples can and preferably are arranged so that the hot junctions protrude relatively small distances beyond the disc and the cold junctions protrude relatively large distances beyond the adjacent disc face as shown in FIG. 4. The disc of course is positioned so that the hot junctions are inside the firepot and the cold junctions are below the firepot. The number of thermocouple elements in each thermopile may be varied depending on such factors as the materials for the thermocouple elements, the nature of motor 18, and the load to be carried by food support 16. In its broader aspects the invention can be employed with food cooking apparatus wherein the heat source is something other than burning coals, as for example gas flame apparatus. Other variations from the illustrated constructions may be resorted to as come within the scope of the appended claims.

We claim:

1. In a food cooking apparatus comprising a firepot for containing burning coals; a rotary food support disposed above the firepot; electrically-energized power means arranged to operate the food support; and a thermopile operatively located to supply electrical energy to the power means; said thermopile comprising a fire-resistant insulator disc having a first face directed toward the pot interior and a second face directed away from the pot interior, and dissimilar thermocouple elements protruding through the disc; said elements being connected together to form hot junctions adjacent said first disc face and cold junctions adjacent the second disc face; said thermopile disc being locatable in the firepot atop the burning coals with its first face directed downwardly, whereby the hot junctions are enabled to be essentially immersed in the burning coals; said disc having an annular upwardly-outwardly flaring edge connecting the first and second faces for directing radiant heat away from the cold junctions.

2. In a food cooking apparatus comprising a firepot for containing burning coals; a rotary food support disposed above the firepot; electrically-energized power means arranged to operate the food support; and a thermopile operatively located to supply electrical energy to the power means; said thermopile comprising an annular retainer ring and a fire-resistant insulator disc therein having a first face directed toward the pot interior and a second face directed away from the pot interior, and dissimilar thermocouple elements protruding through the disc; said elements being connected together to form hot junctions adjacent said first disc face and cold junctions adjacent the second disc face; said thermopile disc being locatable in the firepot atop the burning coals with its first face directed downwardly, whereby the hot junctions are enabled to be essentially immersed in the burning coals; said disc having an annular upwardly-outwardly flaring edge connecting the first and second faces for directing radiant heat away from the cold junctions.

3. In a food cooking apparatus comprising a firepot for containing burning coals; a rotary food support disposed above the firepot; electrically-energized power means arranged to operate the food support; and a thermopile operatively located to supply electrical energy to the power means; said thermopile comprising a fire-resistant disc having a first face directed toward the pot interior and a second face directed away from the pot interior, and dissimilar thermocouple elements protruding through the disc; said elements being connected together to form hot junctions adjacent said first disc face and cold junctions adjacent the second disc face; said elements protruding approximately one-quarter inch beyond the first disc face and approximately one inch beyond the second disc face; said thermopile disc being locatable in the firepot atop the burning coals with its first face directedly downwardly, whereby the hot junctions are enabled to be essentially immersed in the burning coals; said disc having an annular flaring edge connecting the first and second faces for directing radiant heat away from the cold junctions.

References Cited by the Examiner

UNITED STATES PATENTS

| 781,288 | 1/1905 | Marsh | 136—6 |
|---|---|---|---|
| 781,289 | 1/1905 | Marsh | 136—4 |
| 2,126,656 | 8/1938 | Pack | 136—4 |
| 2,813,478 | 11/1957 | Popple | 99—421 X |
| 3,106,150 | 10/1963 | Gaeke | 99—421 X |
| 3,125,016 | 3/1964 | McDowell | 99—421 |
| 3,129,653 | 4/1964 | Kertesz | 99—421 |

FOREIGN PATENTS 316,124  11/1956  Switzerland.

WALTER A. SCHEEL, *Primary Examiner.*

ROBERT E. PULFREY, *Examiner.*

STANLEY P. FISHER, *Assistant Examiner.*